United States Patent [19]

Sahara

[11] Patent Number: 4,686,733
[45] Date of Patent: Aug. 18, 1987

[54] RETRACTABLE TYPE WIPER APPARATUS

[76] Inventor: Hideshi Sahara, 1-96 Kitahara, Takashi-cho, Toyohashi-shi, Aichi-ken, Japan

[21] Appl. No.: 852,527

[22] Filed: Apr. 16, 1986

[30] Foreign Application Priority Data

Apr. 20, 1985 [JP] Japan .................................. 60-84786

[51] Int. Cl.[4] ............................ B60S 1/22; B60S 1/24
[52] U.S. Cl. .................................... 15/250.16; 74/70; 74/75; 74/600
[58] Field of Search ........... 15/250.16, 250.17, 250.34; 74/600, 601, 70, 75

[56] References Cited

U.S. PATENT DOCUMENTS 3,800,624  4/1974  Klement et al. ...................... 74/600
3,942,385  3/1976  Westerdale .................. 15/250.17 X
4,400,844  8/1983  Hayakawa et al. ................. 74/70 X
4,454,626  6/1984  Schmidt et al. .................. 15/250.16
4,559,845  12/1985  Fallows ....................... 15/250.16 X

FOREIGN PATENT DOCUMENTS

59-190648  4/1985  Japan .

Primary Examiner—Peter Feldman
Attorney, Agent, or Firm—Welsh & Katz, Ltd.

[57] ABSTRACT

A retractable wiper apparatus is disclosed in which two cam members are mounted about a drive shaft, the cam members serving to retain a detent in a locked position during rotation of the drive shaft in the forward direction and during the wiping operation. Upon reversal of the drive shaft rotational movement, the detent is released by the cam members and the wiper is placed in a retracted position.

1 Claim, 37 Drawing Figures

RETRACTABLE TYPE WIPER APPARATUS

TECHNICAL FIELD

This invention relates to a wiper apparatus for wiping a windshield of an automobile, and more particularly to improvements on a retractable type wiper apparatus the wiper blade of which is adapted to be retracted or concealed from view when not in use.

BACKGROUND ART

Figure 20:
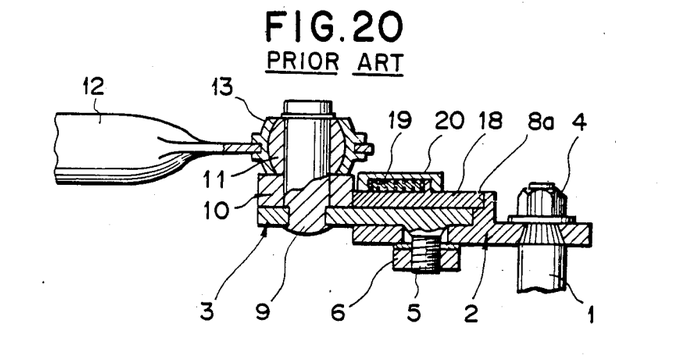
FIG. 20 is a longitudinal cross-sectional view of a prior art retractable type wiper apparatus.
Figure 21:
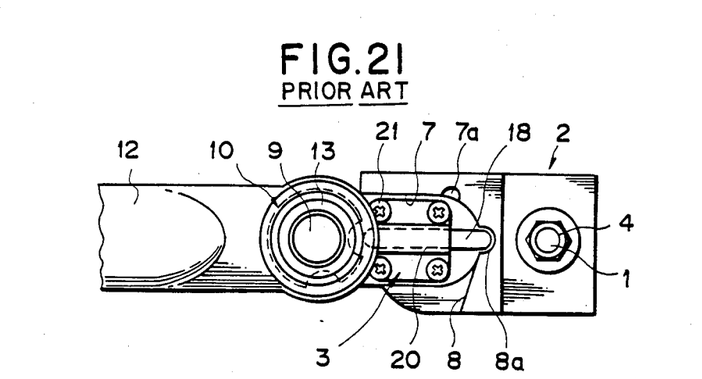
FIG. 21 is a plan view of the wiper apparatus shown in FIG. 12.
Figure 22:
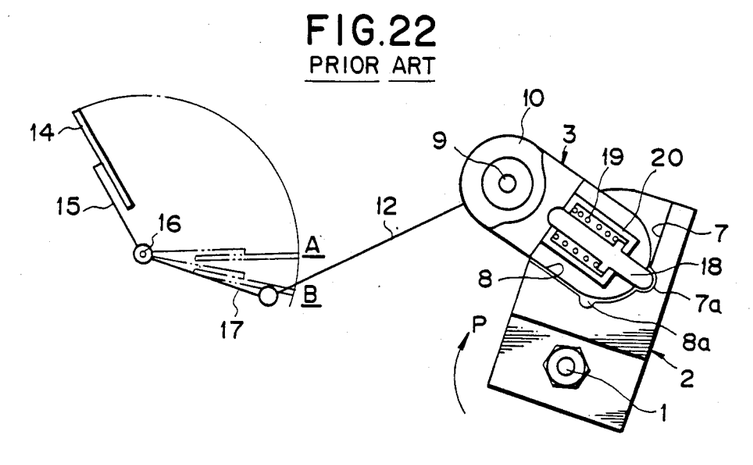
FIG. 22 is a diagrammatic view illustrating the wiper apparatus in operation.

Japanese Utility Model Application Public Disclosure (Kohkai publication) No. 59-190648 discloses a typical retractable wiper apparatus of the type described, as shown in FIGS. 20 to 22 attached to the present application.

More specifically, the prior art wiper apparatus illustrated therein comprises a first crank 2 connected to and locked by a nut 4 to an output shaft 1 of a reducer which is in turn connected to a wiper motor, and a second crank 3 which is secured to the first crank by means of a first pivot shaft 5 projecting from the second crank and a nut 6. The first crank 2 is formed with stop shoulders 7 and 8 having locking recesses 7a and 8a, respectively. Secured to the second crank 3 is a second pivot shaft 9 over which a cam 10 is fitted. A bearing 11 is also fitted over the pivot shaft 9 and secured integrally to the cam 10. A first link 12 is secured to the bearing 11 by means of a socket 13 which is connected to the link 12 and adapted to receive the bearing 11.

A wiper blade 14 is supported by an arm 15 which is secured at a pivot 16 to a second link 17 which is in turn connected to the first link 12. A detent 18 engageable with locking recesses 7a, 8a is slidably mounted in a guide frame 20 and is biased outwardly by a spring 19. The frame 20 is fastened to the second crank 3 by screws 21.

During the normal wiping operation the motor output shaft 1 is rotated in the forward direction of rotation as indicated by the arrow P. The rotation of the first crank 2 in this direction causes the second crank 3 connected by links 12 and 17 to the wiper arm 15 to be relatively rotated about the pivot shaft 5 due to the rotational resistance of the second crank until the second crank is bent relative to the first crank and comes into abutment with the stop shoulder 8 of the first crank 2, whereupon the detent 18 is urged into the recess 7a to lock the second crank to the first crank at said bent angle. While angled relative to the first crank 2 as shown in FIG. 22, the second crank 3 is thus rotated about the output shaft 1 in the direction P, whereby the pivot pin 16 is moved in its reciprocal rotating motion by means of the links 12, 17 to operate the wiper blade 14 for wiping action.

The range in which the wiper blade is reciprocally moved with the second crank 3 angled relative to the first crank 2 is a normal range of operation. Upon the wiper motor being deenergized, the wiper blade is stopped at the extreme end A of the range of operation by an automatic stopping—at—fixed position mechanism (not shown).

When it is desired to stow away or retract the wiper arm from its normal stop position, the wiper motor is driven in the reverse direction, so that the first crank 2 is rotated in a direction opposite from that indicated by the arrow P. The second crank 3 which is connected to the wiper blade by means of the links is caused to relatively rotate about the pivot shaft 5 due to the rotational resistance until the crank 3 comes into abutment with the stop shoulder 7 of the first crank 2 to assume the straight extended position whereupon the detent 17 is urged into the recess 8a to lock the second crank at its extended position.

The effective length of the cranks when the second crank 3 is extended straight relative to the first crank 2, that is, the distance between the two shafts 1 and 9 is longer than the distance between the two shafts 1 and 9 when the second crank is at its angled position, so that the wiper blade at its normal stop position A in FIG. 22 is retracted beyond its normal range of operation into the retracted or concealed position B.

During the wiping and blade retracting operations the cam 10 fitted over the pivot shaft 9 of the second crank 3 is rotated in unison with the link 12. The cam 10 is adapted to press and lock the detent 18 which is in engagement with the recess 7a during the forward rotation for the wiping operation and to disengage from the detent upon reverse rotation through some degrees of angle (about 35°) after the normal rotation (180°) and press and lock the detent 18 as it is engaged with the recess 8a when the second crank 3 is completely extended relative to the first crank.

While the prior art retractable wiper apparatus described above is capable of retracting the wiper blade from the normal stop position into the retracted position by means of the relatively simple mechanism, during the normal continuous driving of the motor (wiper operation) with the second crank 3 bent at the predetermined angle relative to the first crank 2 such condition occurs once per rotation that the cam 10 is disengaged from pressing contact with the detent 18. In such condition there is instability in operation in that the biasing force of the spring 19 alone is relied on for urging the detent 18 into the recess 7a of the stop shoulder 7. As a result, play or creaking tends to occur, causing clattering at the tip of the wiper blade and making the automobile driver feel uneasy.

Briefly, the present invention provides a retractable type wiper apparatus comprising a first crank connected to an output shaft of a reducer of a wiper motor; a second crank rotatably secured to the first crank by means of a first pivot shaft and so arranged that the second crank is kept bent at a predetermined angle relative to the first crank during the rotation of the first crank in the forward direction, and kept extended substantially straight relative to the first crank during the rotation of the first crank in the reverse direction; a detent slidably mounted in the second crank and adapted to be resiliently urged into a first recess and a second recess in the first crank to thereby lock the second crank in place when the second crank is positioned at the predetermined angled and at the straight extended position, respectively relative to the first crank; link means rotatably connected to the second crank by means of a second pivot shaft for transmitting the motion of the second crank to a wiper blade; and cam means rotatably mounted over the second pivot shaft and adapted to press and lock said detent as it is urged into either said first or second recess; characterized in that said cam comprises two superposed cam members both engageable with said detent, one of the cam members being connected integrally with said link means and the other of the cam members being adapted to be moved together with the one cam member with a limited range of lost motion so that the two cam members are maintained at such angles relative to each other that they cooperate to press and lock said detent during the rotation of said first crank in the forward direction.

DISCLOSURE OF INVENTION

Accordingly, it is an object of this invention to provide an improved retractable wiper apparatus in which the cam means for pressing and locking the detent in place comprises two cam members cooperating to always maintain the detent in its pressed and locked position during the rotation of the output shaft of the reducer in the forward direction (wiping operation) whatover angular position the cams may be at whereby there may be no chattering or creaking during the wiping operation.

BRIEF DESCRIPTION OF THE DRAWINGS

The features and advantages of the present invention will be more fully disclosed in the following specification with reference to the accompanying drawings, in which:

FIGS. 6A-11A and 6B-11B are diagrammatic views illustrating the successive steps of the wiping operation by the wiper apparatus;

FIGS. 12A-16A and 12B-16B are diagrammatic views illustrating the successive steps of the retracting operation of the wiper apparatus;

DETAILED DESCRIPTION OF THE PREFERRED EMBODIMENTS

Figure 1:
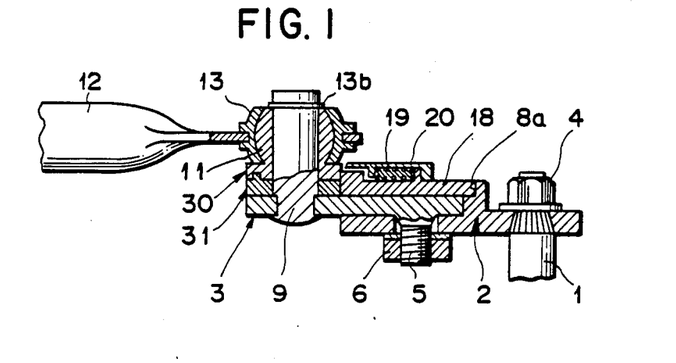
FIG. 1 is a longitudinal cross-sectional view of the principal part of the retractable type wiper apparatus according to one embodiment of the present invention.
Figure 2:
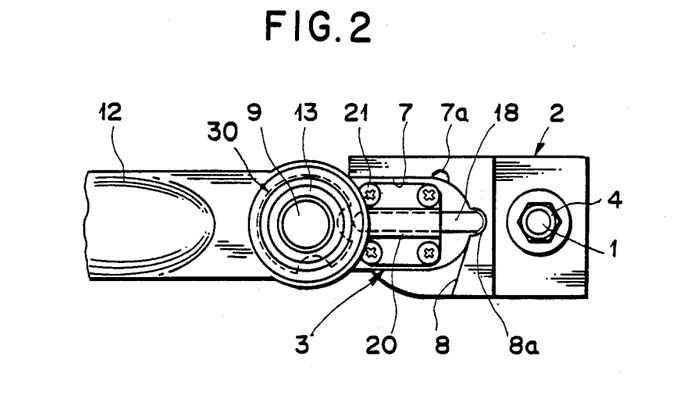
FIG. 2 is a plan view of the wiper apparatus shown in FIG. 1.
Figure 3:
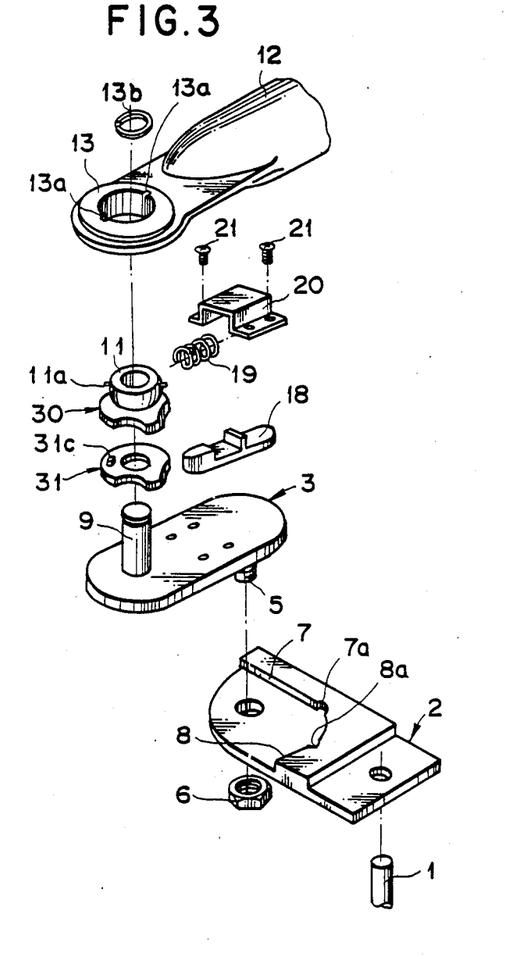
FIG. 3 is an exploded perspective view of the wiper apparatus shown in FIG. 1.
Figure 4A:
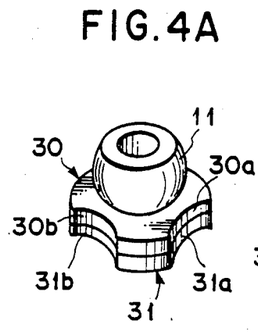
FIG. 4A is a perspective view of the cam means according to the present invention illustrating the two cam members at the same angular position.
Figure 4B:
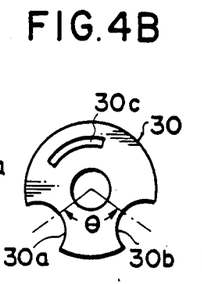
FIGS. 4B and 4C are plan views of the first and second cam members of the cam means shown in FIG. 4A, respectively.
Figure 4C:
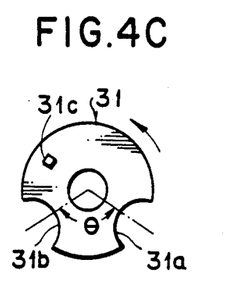
Figure 5A:
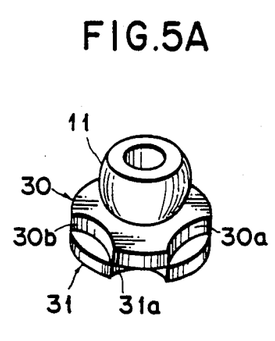
FIG. 5A is a view of the cam means similar to FIG. 4A but illustrating the cam members at different angular positions.
Figures 5B, 5C:
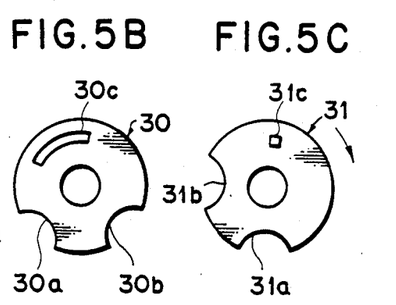
FIGS. 5B and 5C are plan views of the first and second cam members of the cam means shown in FIG. 5A, respectively.

An embodiment of the present invention will now be described with reference to FIGS. 1 to 3 in which components of the wiper apparatus of this invention which are similar to corresponding components of the prior art wiper apparatus described hereinabove and shown in FIGS. 20-22 are designated by the same reference numerals as in the prior art apparatus.

The wiper apparatus according to this invention comprises a first crank 2 connected to a locked by a nut 4 to an output shaft 1 of a reducer (not shown) which is in turn connected to a wiper motor (not shown), and a second crank 3 which is secured to the first crank 2 by means of a first pivot shaft 5 projecting from the second crank and a nut 6. The first crank 2 is formed with stop shoulders 7 and 8 having locking recesses 7a and 8a, respectively. Secured to the second crank 3 is a second pivot shaft 9 over which cam means comprising two stacked cam members 30, 31 is rotatably mounted. A bearing 11 is integrally connected with the upper cam member 30 of the cam means and is also fitted over the pivot shaft 9. A first link 12 is securely connected to the bearing 11 by means of a socket 13 adapted to receive the bearing and having slots 13a for receiving connecting pins 11a projecting from the bearing to prevent relative rotational movement between the socket and bearing. A snap ring 13b is mounted on the shaft 9 to retain the bearing 11 in place.

The cam members 30 and 31 are formed around its periphery with two notches 30a, 30b and 31a, 31b, respectively spaced apart from each other by a displacement angle $\theta$ of 120° as shown in FIGS. 4A-4C and 5A-5C. The upper cam member 30 connected integrally with the bearing 11 is further formed with a concentric arcuate slot 30C extending through a lost-motion angle of 60°. The lower cam member 31 has a projection extending therefrom and adapted to be inserted into the arcuate slot 30C.

The wiping operation of the wiper apparatus constructed as described above will be described with reference to FIGS. 6A-11A and 6B-11B.

Figure 6A:
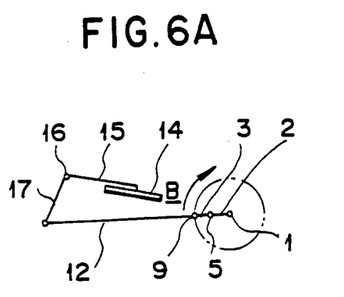
Figure 6B:
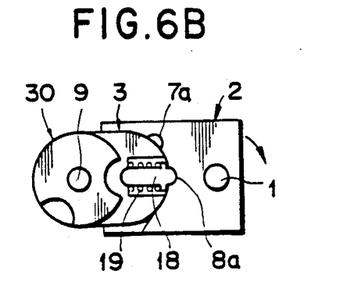

FIGS. 6A and 6B illustrate the wiper blade 14 stopped at the retracted position B wherein the second crank 3 is extended straight in axial alignment with the first crank 2. The notches 30a, 30b and 31a, 31b of the cam members 30 and 31, respectively are in alignment with each other, and the aligned notches 30a, 31a are in an angular position opposing the detent 18, so that the detent, released from the locking action by the cam members 30, 31, is urged into the locking recess 8a by the biasing force of the spring 19 alone.

Figure 7A:
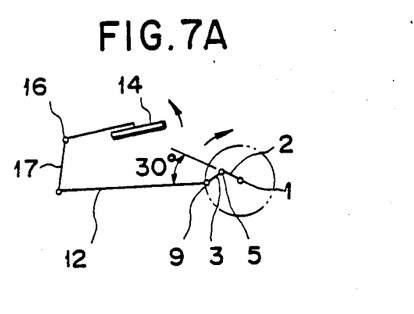
Figure 7B:
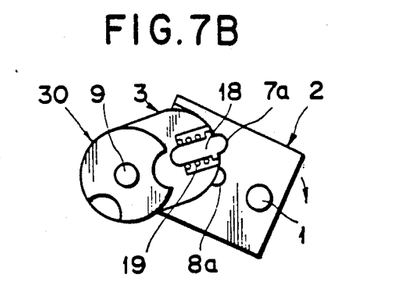

FIGS. 7A and 7B illustrate the first crank 2 rotated through about 30° by the driving of the wiper motor in the forward direction, whereby the detent 18 is dislodged from the recess 8a and urged into the recess 7a with the second crank 3 bent at the corresponding angle relative to the first crank 2.

Figure 8A:
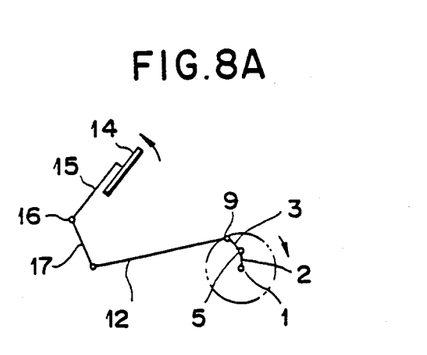
Figure 8B:
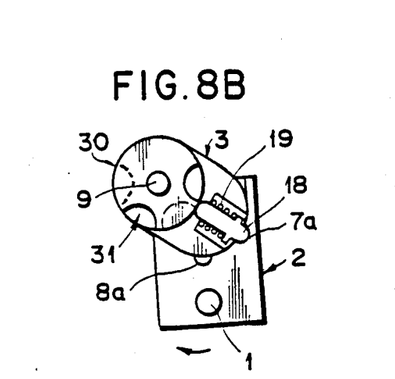

FIGS. 8A and 8B illustrate the first crank 2 further rotated through about 60°, whereby the cam member 30 is rotated through a corresponding angle while the projection 31C of the second cam 31 relatively moves along the arcuate slot 30C from one end to the other end thereof where there is a displacement in phase between the notches 30a, 30b of the cam member 30 and the notches 31a, 31b, whereby the two cam members cooperate to define a complete circular cam to lock the detent 18 in place.

Thereafter, the cam members 30 and 31 will be rotated in unison while maintaining the detent 18 locked.

Figure 9A:
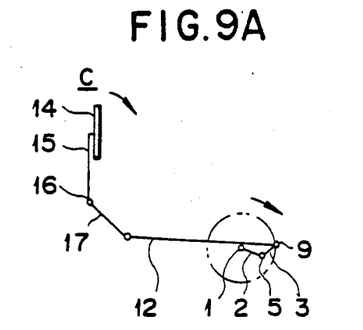
Figure 9B:
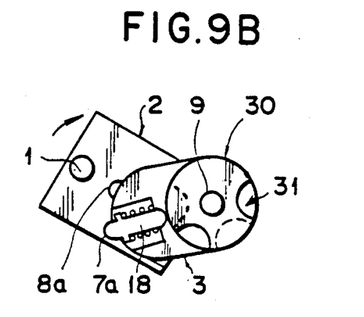

FIGS. 9A and 9B illustrate the wiper blade 14 having arrived at one extreme end C of the wiping movement, from which the wiper blade is reversed in its direction of movement.

Figure 10A:
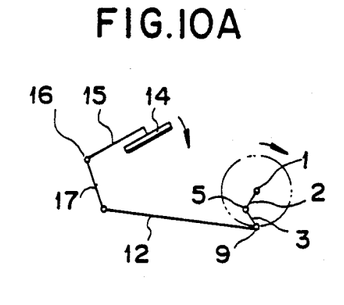
Figure 10B:
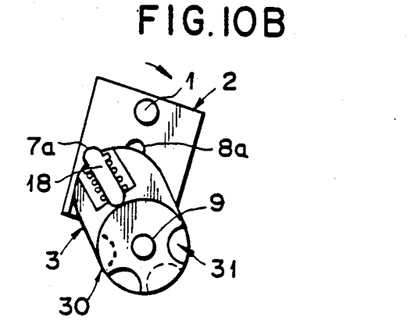

FIGS. 10A and 10B illustrate the wiper blade being rotated in the reverse direction.

Figure 11A:
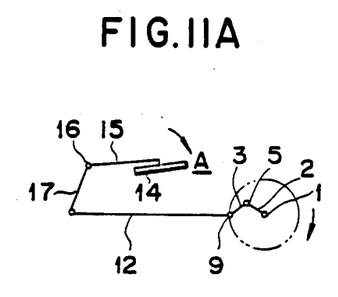
Figure 11B:
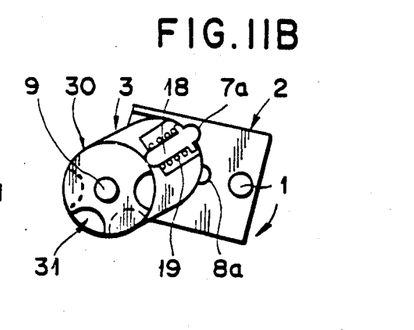

FIGS. 11A and 11B illustrate the wiper blade 14 having reached the other extreme end A of the wiping movement which is the point of reversal for the normal wiping operation.

Next, the operation for stowing the wiper blade to the retracted position will be described with reference to FIGS. 12A–16A and 12B–16B.

When it is desired to retract the wiper blade to the recessed position B, a switch (not shown) disposed in an electric power supply circuit (not shown) is thrown into an "off" position, said circuit having an automatic stopping—at—fixed position mechanism and a reversing mechanism for the wiper motor. Upon the switch being moved into the off position, the wiper motor is continued to be rotated in the forward direction under the control of the circuit until the wiper blade 14 is moved from the position A back to the position C whereupon the motor is reversed.

Figure 12A:
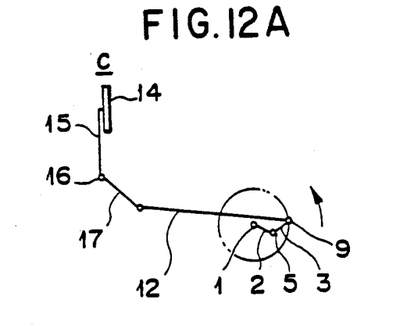
Figure 12B:
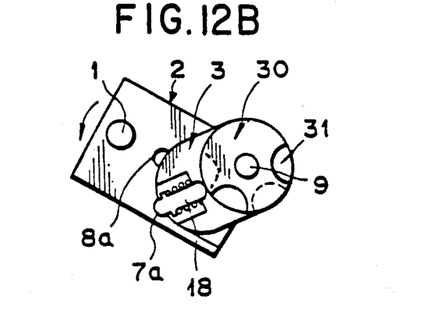

FIGS. 12A and 12B illustrate the wiper blade 14 moved back to the point of reversal C where the wiper motor is reversed to rotate the output shaft 1 in the reverse direction.

Figure 13A:
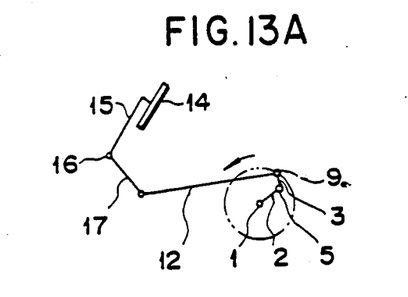
Figure 13B:
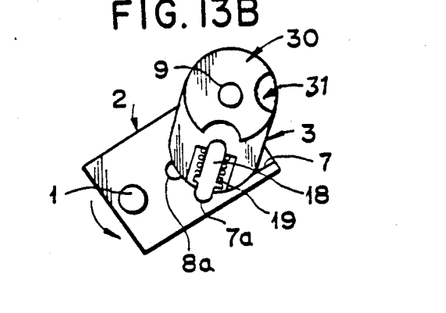

FIGS. 13A and 13B illustrate the first crank 2 rotated through about 60° by the reverse rotation of the output shaft 1. In this position the notches 30a, 30b and 31a, 31b of the cam members 30 and 31, respectively are in alignment with each other, and the aligned notches 30b, 31b are in an angular position opposing the detent 18, so that the detent is released from the locking action by the cam members.

Figure 14A:
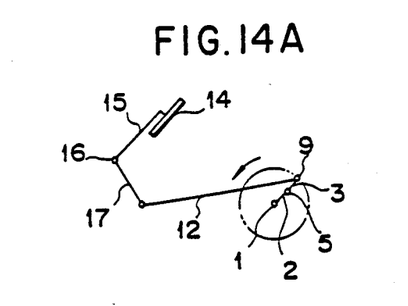
Figure 14B:
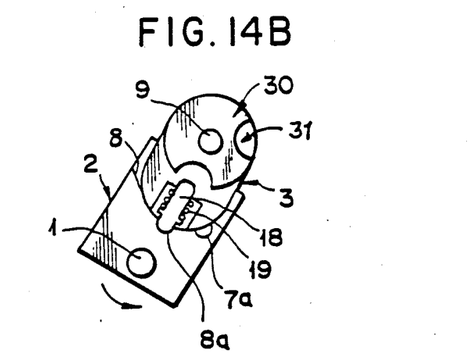

FIGS. 14A and 14B illustrate the detent 18 dislodged from the recess 7a and urged into the recess 8a while the second crank 3 is disengaged from the stop shoulder 8 and brought into abutment with the stop shoulder 7 so that the first and second cranks are straightened in longitudinal alignment.

Figure 15A:
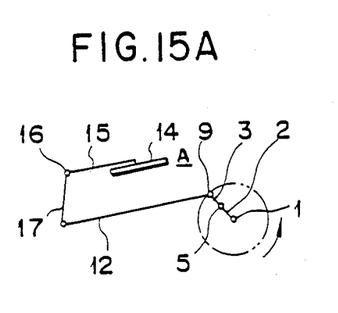
Figure 15B:
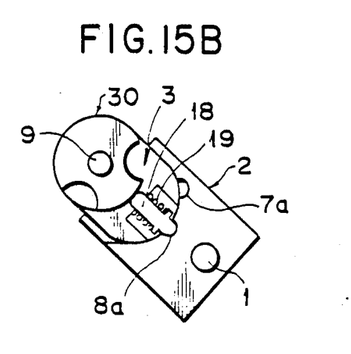

FIGS. 15A and 15B illustrate the first and second cranks 2, 3 further rotated in the reverse direction until the wiper blade 14 has reached the extreme end A of the normal wiping movement.

Figure 16A:
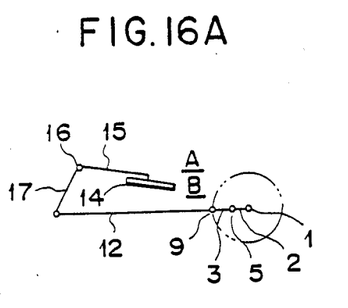
Figure 16B:
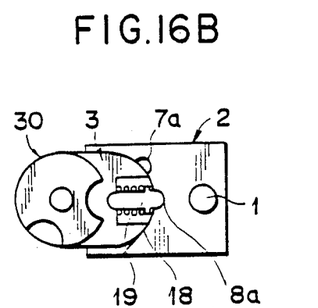

FIGS. 16A and 16B illustrate the first and second cranks 2, 3 in their straightened position continuing to rotate until the wiper blade 14 has been moved from the extreme end A of the wiping movement to the retracted position B. Upon the blade 14 reaching the retracted position, the automatic stopping—at—fixed position mechanism is actuated to stop the wiper motor. When the wiper blade 14 is thus moved to the retracted position B by the reverse rotation of the output shaft 1, the notches 30a, 30b and 31a, 31b of the cam members 30 and 31, respectively are aligned with each other, and the aligned notches 30a, 31a are in an angular position opposing the detent 18 to release the locking action on the detent.

It is thus to be understood that the cam means for locking the detent which serves to join the first and second cranks 2, 3 comprises two cam members and that the two cam members are arranged to cooperate during the wiping operation to maintain said detent in its locked position irrespective of the angular position of the cam members, whereby it is assured that no play or creaking occurs in the crank mechanism during the wiping operation.

While in the illustrated embodiment the angle of displacement between the notches 30a, 31a and 30b, 31b of the cam members 30 and 31 is shown as 120°, the angle of arc (lost motion) of the arcuate slot 30C of the cam member 30 is shown as 60°, and the bent angle between the first and second cranks 2, 3 is described as 30°, these angles may be varied depending upon the amount in which the wiper blade is to be retracted.

Figure 17:
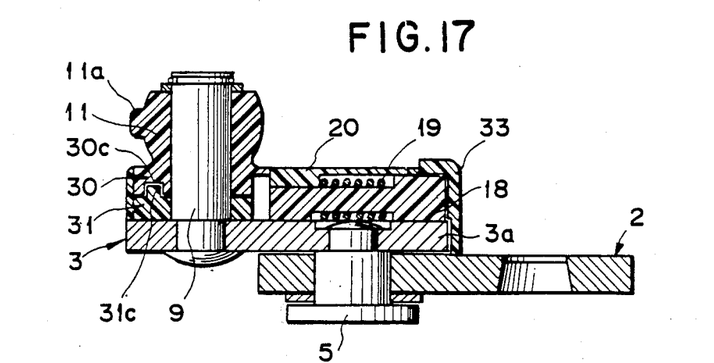
FIG. 17 is a longitudinal cross-sectional views of the principal part of the retractable type wiper apparatus according to an alternate embodiment of the invention.
Figure 18:
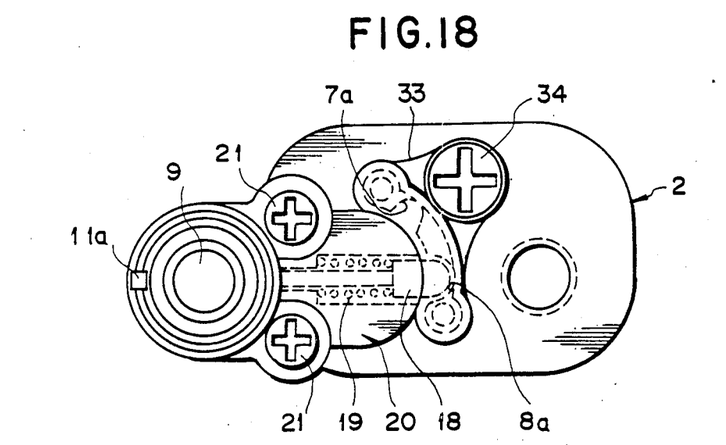
FIG. 18 is a plan view of the wiper apparatus shown in FIG. 17.
Figure 19:
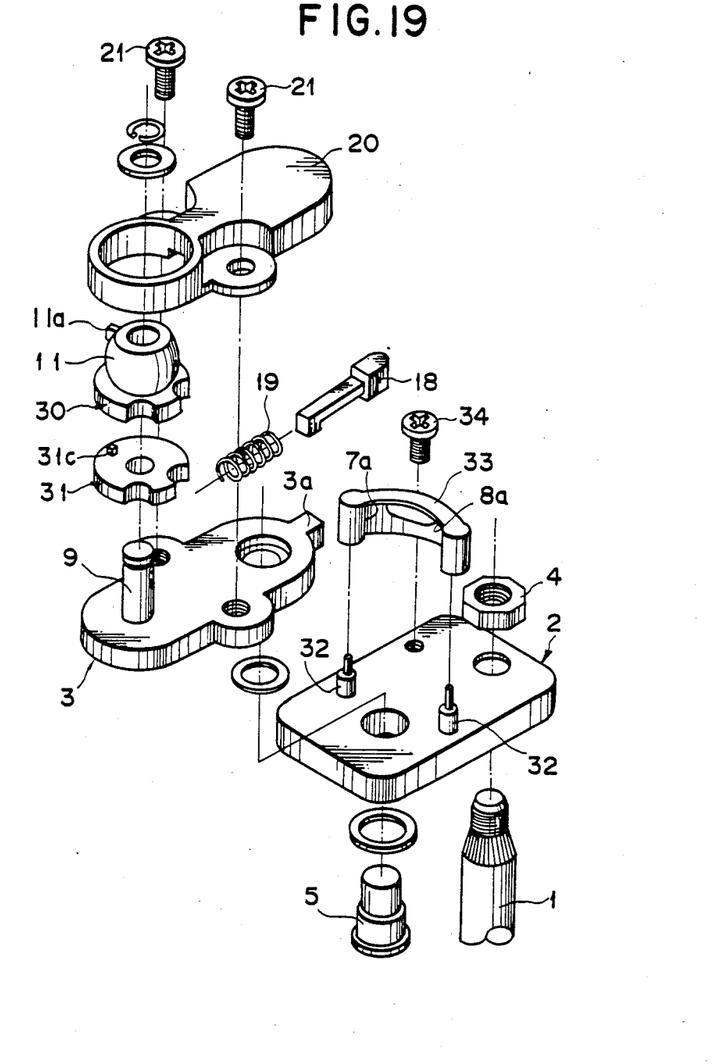
FIG. 19 is an exploded perspective view of the wiper apparatus shown in FIG. 17.

FIGS. 17 to 19 show an alternate embodiment of the wiper apparatus of this invention, in which component portions of the wiper apparatus which are similar to corresponding portions of the wiper apparatus shown in FIGS. 1–16 are designated by the same reference numerals as in the first embodiment.

Only those component portions of the apparatus according to this alternate embodiment which are different from corresponding portions of the first embodiment will be designated by new reference numerals and described below.

In this modified embodiment, an arcuate stop member 33 is fitted at its opposite ends over a pair of spaced apart pins upstanding from the first crank 2, in substitution for the stop shoulders 7 and 8 in the first embodiment. The stop member 33 is further secured by a screw 34. The straight extended position and the angled position that the second crank assumes relative to the first crank 2 are determined by an extension 3a of the second crank abutting against the opposite ends of the stop member 33 adjacent the pins 32. In addition, the arcuate stop member 33 is formed adjacent the opposite ends thereof with a pair of spaced locking recesses 7a and 8a for receiving the detent 18 at its angled and straight extended positions, respectively.

It will be appreciated that the wiper apparatus according to this modified embodiment will provide the same functional advantages at the first embodiment does.

What is claimed is:

1. A retractable type wiper apparatus comprising a first crank connected to an output shaft of a reducer of a wiper motor; a second crank rotatably secured to the first crank by means of a first pivot shaft and so arranged that the second crank is kept bent at a predetermined angle relative to the first crank during the rotation of the first crank in the forward direction, and kept extended substantially straight relative to the first crank during the rotation of the first crank in the reverse direction; a detent slidably mounted in the second crank and adapted to be resiliently urged into a first recess and a second recess in the first crank to thereby lock the second crank in place when the second crank is positioned at the predetermined angled and at the straight extended position, respectively relative to the first crank; link means rotatably connected to the second crank by means of a second pivot shaft for transmitting the motion of the second crank to a wiper blade; and cam means rotatably mounted over the second pivot shaft and adapted to press and lock said detent as it is urged into either said first or second recess; characterized in that said cam comprises two superposed cam members both engageable with said detent, one of the cam members being connected integrally with said link means and the other of the cam members being adapted to be moved together with the one cam member with a limited range of lost motion so that the two cam members are maintained at such angles relative to each other that they cooperate to press and lock said detent during the rotation of said first crank in the forward direction.

* * * * *